April 20, 1937.   E. R. POWELL   2,078,158
METHOD OF UTILIZING SLAG
Filed June 21, 1933
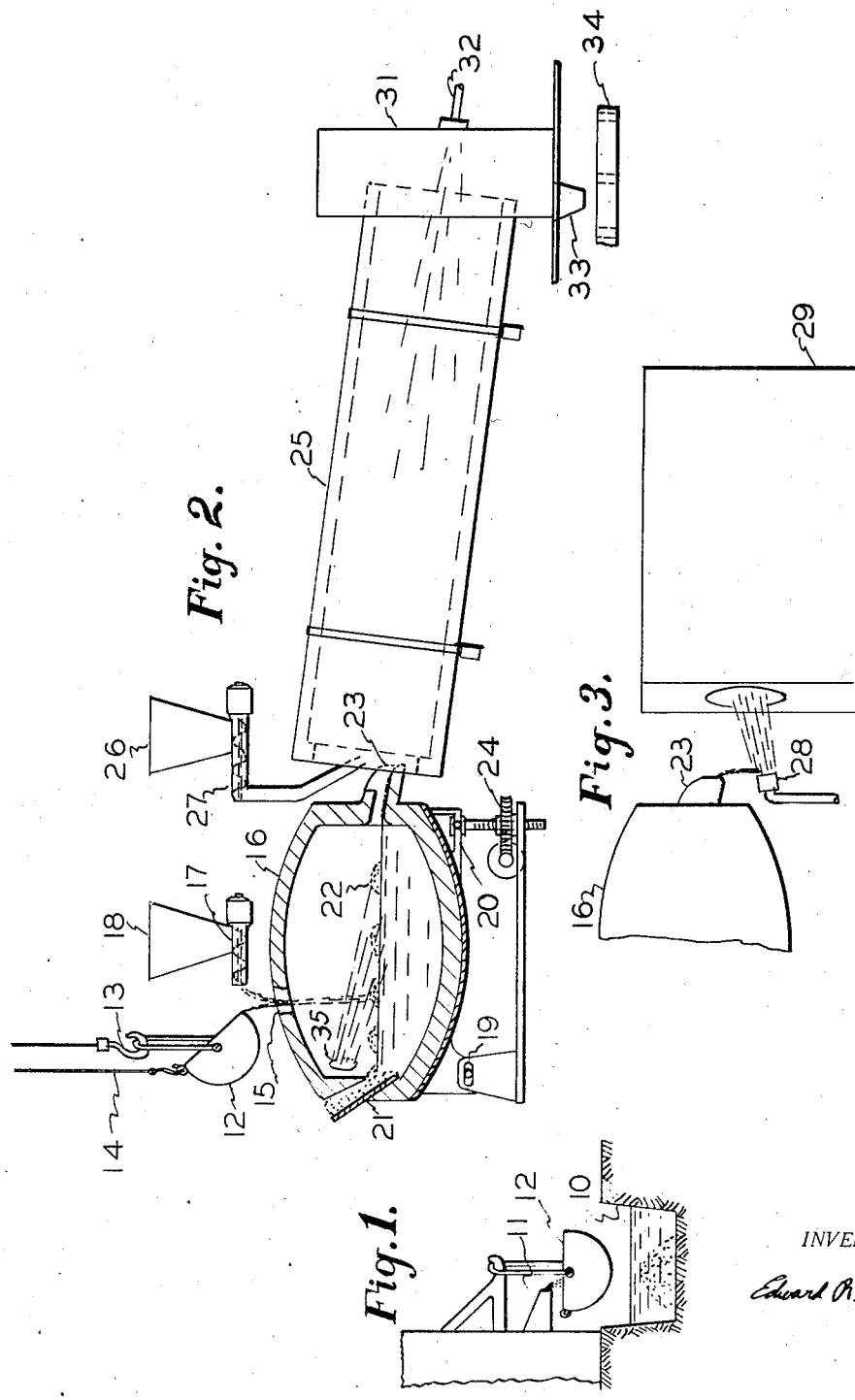
INVENTOR.
Edward R. Powell Patented Apr. 20, 1937

2,078,158

UNITED STATES PATENT OFFICE 2,078,158

METHOD OF UTILIZING SLAG

Edward R. Powell, Alexandria, Ind., assignor to Johns-Manville Corporation, New York, N. Y., a corporation of New York Application June 21, 1933, Serial No. 676,851

3 Claims. (Cl. 49—77.5)

This invention relates to the utilization of slags which are formed in the smelting of various metals such as iron, lead and copper, or in allied operations.

It relates particularly to satisfactory handling and treating methods for melted slags and to the correction of the composition and properties of the slags so as to adapt them to relatively refined purposes for which glass and specially prepared materials are used at present.

One principal object of the invention is to provide a method of utilization which will permit taking full advantage of available slag supplies in melted condition without interfering with the operations of the metallurgical plants in which they are produced. The slags are produced principally as by-products or waste products due to the fluxing of the impurities of the ores of the above metals with each other or with fluxes which are added. Slag is sometimes used for making portland cement, but often used for ballast or discarded. In some instances, the slags are now discarded rather than utilize them at a risk of interfering with the main operations of the plants.

Another object of the invention is to utilize the heat already present in the slags as they run from the furnaces so that great economies may be effected in the manufacture of vitreous articles and products. These products include electrical insulators, containers, building units, mineral wool, sheets, slabs and various novelties and small articles.

A special feature of this invention relates to the successful removal of the slag from the furnace where it is produced to the equipment which is used for its utilization. The removal is preferably conducted intermittently in a ladle or bucket carried by a crane or car. A continuous conveyor would expose a considerable additional surface to radiation. The lots of slag as delivered should be received and stored so that a more or less continuous flow of melt will be available for utilization at a point remote from the furnace which produced it.

The full nature of the invention will be understood from the accompanying drawing and the following description and claims: In the drawing, Fig. 1 is a diagrammatic elevation of a part of a smelting furnace where the slag is discharged.

Fig. 2 is a diagrammatic elevation of apparatus for the utilization of slag, parts being shown in central section.

Fig. 3 is a diagrammatic elevation of part of the same apparatus as Fig. 2 but arranged for another form of product.

Referring to Fig. 1, a spout 11 is shown from which slag flows from a smelting operation or allied process. The slag is shown flowing into a ladle 12 which is hung under the spout. When the ladle is removed, the slag may flow into pit 10 containing water and be granulated. This invention relates mainly to the melted material. The arrangement shown in this figure is to provide for an excess of slag in the event that more slag is produced than can be utilized. Some smelters have no granulating pit and are equipped with slag cars which are relied on to dispose of the slag as it is produced.

In Fig. 2, the ladle 12 is shown being emptied into a furnace 16 through an opening 15. The ladle 12 may have been filled as shown in Fig. 1 or in some other conventional manner. Two hooks 13 and 14 operated by a crane in turn operate the ladle. Any controllable mechanism for carrying a ladle of slag and pouring the slag into a furnace might be used for this operation.

A feeding device 17 and hopper 18 are adapted to deliver comminuted material into opening 15. In the preferred embodiment of the invention it is desirable to deliver a controlled amount of material adapted to correct the composition of the slag simultaneously with the delivery of the slag so that a certain amount of mixing is accomplished in the delivery of the materials.

Furnace 16 is built preferably of refractory materials carried by a steel frame. A plurality of chutes 21 terminating in openings such as 22 permit introduction of sand or other small sized high melting point material which protects the furnace from erosion at the slag line. The protective material is introduced through the apertures at positions adjacent to the zone of contact between the surface of the molten material and the inside of the wall of the container therefor, as illustrated. The protective material dissolves in the molten material and serves to give a resultant mixture of lesser fluidity than the original slag and a lesser rate of corrosion or dissolving of the wall of the container. One or more flames are applied at openings such as 35 to maintain a temperature or provide agitation or control the reactions, or all three. The main purposes of the furnace 16 are to maintain a pool of slag for mixing, storing, reacting, changing temperature and controlling flow. The use of the chutes 21 for erosion control is not always necessary but at high temperatures with neutral or slightly acid melts, most inexpensive refractories will be rapidly eroded if not protected.

The furnace 16 is supported partly by pivots such as 19 and partly by a bracket 20 which coact with worm and screw mechanism 24 so that accurate control of the slope of the furnace is afforded. This permits a desired rate of flow from or toward spout 23. The worm and screw device 24 is preferably power driven for large furnaces but may be manually controlled or the control may be automatic.

Fig. 2 shows the slag delivered to a rotary device 25 for further treatment. Additional material fed by hopper 26 and feeder 27 may be admixed therewith. A housing 31 and burner 32 are provided for maintaining the desired temperatures in 25. The fully treated material is discharged through chute 33 into molds 34.

Fig. 3 shows the slag being withdrawn from furnace 16 in one or more streams suitable for blowing into mineral wool. The stream or streams of melt are shredded by steam or air jets 28 and blown into settling chamber 29.

The nature of some of the corrections needed in slag composition may be explained in part as follows: In some cases, the slags are in highly reduced condition and contain considerable percentages of sulphides. Their composition may be improved for most purposes by maintaining an oxidizing reaction in furnace 16. For a nearly colorless melt, which contains ½ to 2% iron oxide, the melt should be about half reduced and half oxidized. This latter control is of importance in mineral wool manufacture.

Slags from smelting operations usually contain large percentages of lime, magnesia, iron and other basic materials, and small percentages of silica. For example, blast furnace slag often contains only 32 to 36 per cent of silica and lead slag still lower percentages. These percentages are lower than the optimum for mineral wool manufacture, inasmuch as rock wool of conventional type contains 39 to 42 percent or more of silica. The addition of silica to such a slag would, therefore, correct the proportion of silica to that required for mineral wool manufacture. Furthermore, the addition of silica improves the annealing properties of the slag. Slags allowed to solidify, without addition of silica, anneal to a dull or dense luster similar to that of certain rocks, instead of to a composition of vitreous luster. Also, slags in their original composition are frequently reactive to water and dilute acids, this objection to such slags for mineral wool manufacture being also minimized by the addition of silica to the slag.

As indicated above, I add the siliceous material to the slag preferably before the slag has ever been allowed to solidify subsequent to its initial manufacture in molten condition. In this manner, there is obtained the desired annealing effect of the silica admixture before the slag is allowed to undergo any solidification or crystallization. Also, as illustrated in the drawing (Fig. 2) the siliceous material may be added continuously, as by the feeder 17, to a stream of the slag flowing in molten condition under the influence of gravity, so that small increments or portions of the slag are well mixed in a short period of time with the siliceous admixture.

Another feature in the utilization of slag may be the addition of some frothing agent so that the slag will form a frothed structure so that a large bulk will result from a given weight. The frothed material is apparently less dense and has heat insulating value. It may be used for general structural purposes when prepared in accordance with the present invention because it will have a stable composition.

To form a frothed slag block, a low-melting slag is preferred initially. Addition of materials such as borax and soda ash by feeder 17 will lower the melting point. This slag should be mixed with hydrated, or carbonated gas-forming material which does not give off all of its gas below the melting point of the slag or is adapted to generate a substantial amount of gas at a very high temperature that is above the melting point of the composition into which the gas-forming material is incorporated. The gas-forming material should be thoroughly mixed as in mixer-kiln 25 with the slag without being thoroughly calcined. After this mixture is complete (intimate), the temperature of the slag should be raised as by flame from 32 so that the gas-forming material will calcine and give off gas. A material such as sand should also be added at the same time as the gas-forming material so that the finally fused mixture will be stable, and may be annealed. Calcining the gas-forming material such as limestone dust or fine asbestos will cause evolution of gases and cause the mass to "rise". The frothed product may be poured into molds or drawn into sheets. The sheets may be reinforced with mesh wire if desired.

In certain instances, the furnace 16 might be so located that the slag might be run into it directly from the smelting operation. In these instances, the pool of melted slag in the furnace would act mainly as a reaction or mixing chamber for correcting the slag composition.

If there is failure of the supply of liquid slag, from the smelting furnaces, solid slag may be melted in a large cupola and allowed to flow into the treating furnace. This will permit continuing the operation of the slag products equipment if there is a shut-down of the smelting operations.

The two forms of apparatus, rotary kiln and blowing operation, are intended to be illustrative of the various uses which may be made of the corrected and/or controlled slag supply. Instead of these, molding machinery for making small objects or rolls for making sheets may be installed. The sheets may be reinforced with rods or mesh wire and corrugated for stiffness if desired.

Vitreous objects may be made of melts which have compositions intermediate in silica content between common slag and common glass. If annealed properly, this intermediate material can be given a "dense" lustre and fairly good mechanical strength. For such manufacture, the corrective material may be principally sand or crushed quartz. This material should be well dried and preferably pre-heated. The term "dense" is used in its geological sense meaning very fine crystalline structure like fine textured basalt, but having no visible grains.

It is to be understood that the products mentioned herein (except mineral wool) may be annealed in conventional manner for glass. The annealing of intermediate composition material formed as explained herein is a feature of the invention.

Many details of common practice such as the operation of oil, gas or powdered fuel burners are omitted since they are not peculiar to this invention. An oxidizing flame may be formed by adjusting a burner to mix a considerable excess of air with the fluid or powdered fuel. A strongly oxidizing flame used on a slag melt may be arranged to convert any entrained metal particles, which are often present in slag, into oxides which dissolve in or react with the rest of the melt. Such metal particles are generally objectionable in vitreous products, especially in electrical insulators. The partial or complete oxidation of the slag may therefore be considered as an essential step. A flame of over 2500 degrees Fahrenheit temperature will oxidize nearly all slags rapidly where the slag surface is exposed.

It will be understood that the details given are for the purpose of illustration, not restriction, and that variations within the spirit of the invention are intended to be included in the scope of the appended claims.

The invention claimed is:

1. In making an article from material of the type of blast furnace slag, the method which comprises providing a supply of the material in molten condition, admixing intimately therewith an agent adapted to develop gas in substantial amount at a very high temperature that is above the temperature of the molten material, raising the temperature of the resulting mixture to the said very high temperature, thus causing the said agent to develop the gas and produce voids in the mixture, and then solidifying the void-containing product.

2. In making mineral wool, the method which comprises manufacturing a molten silicate slag, of silica content below the optimum for mineral wool manufacture, mixing finely divided siliceous material with the slag before the slag is ever allowed to solidify, and then shredding the resulting mixture into mineral wool.

3. In the method described in the immediately preceding claim, the step which includes adding the siliceous material substantially continuously to the slag flowing in the form of a stream under the influence of gravity, whereby the slag in small increments becomes mixed in a short period of time with the siliceous material.

EDWARD R. POWELL.